United States Patent
Tsuzuki et al.

(10) Patent No.: US 12,040,476 B2
(45) Date of Patent: Jul. 16, 2024

(54) NEGATIVE ELECTRODE FOR NONAQUEOUS ELECTROLYTE SECONDARY BATTERY, AND NONAQUEOUS ELECTROLYTE SECONDARY BATTERY

(71) Applicant: Panasonic Intellectual Property Management Co., Ltd., Osaka (JP)

(72) Inventors: Kouhei Tsuzuki, Hyogo (JP); Yuki Morikawa, Hyogo (JP); Hirokazu Wada, Osaka (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 511 days.

(21) Appl. No.: 17/296,487

(22) PCT Filed: Nov. 11, 2019

(86) PCT No.: PCT/JP2019/044175
§ 371 (c)(1),
(2) Date: May 24, 2021

(87) PCT Pub. No.: WO2020/110690
PCT Pub. Date: Jun. 4, 2020

(65) Prior Publication Data
US 2022/0037640 A1 Feb. 3, 2022

(30) Foreign Application Priority Data

Nov. 30, 2018 (JP) .................................. 2018-225706

(51) Int. Cl.
H01M 4/133 (2010.01)
H01M 4/02 (2006.01)
(Continued)

(52) U.S. Cl.
CPC ........... *H01M 4/133* (2013.01); *H01M 4/134* (2013.01); *H01M 4/386* (2013.01); *H01M 4/587* (2013.01);
(Continued)

(58) Field of Classification Search
CPC ...... H01M 4/133; H01M 4/134; H01M 4/386; H01M 4/587; H01M 4/624;
(Continued)

(56) References Cited

FOREIGN PATENT DOCUMENTS

| JP | 2008-171575 A | 7/2008 |
| JP | 2009-231058 A | 10/2009 |

(Continued)

OTHER PUBLICATIONS

English Translation of International Search Repot dated Feb. 4, 2020, issued in counterpart Application No. PCT/JP2019/044175. (2 pages).

*Primary Examiner* — Helen Oi K Conley
(74) *Attorney, Agent, or Firm* — WHDA, LLP

(57) ABSTRACT

A negative electrode for a nonaqueous electrolyte secondary battery, said negative electrode comprising a negative-electrode current collector, and a negative-electrode active material layer provided upon the negative-electrode current collector, wherein the negative-electrode active material layer includes a negative-electrode active material and carboxymethyl cellulose, wherein the molecular weight of the carboxymethyl cellulose in an area that extends 10% in the thickness direction from the surface of the negative-electrode current collector side of the negative-electrode active material layer is smaller than that of the carboxymethyl cellulose in an area that extends 10% in the thickness direction from the surface of the reverse side of the negative-electrode active material layer from the negative-electrode current collector.

9 Claims, 2 Drawing Sheets

(51) Int. Cl.
  *H01M 4/134*    (2010.01)
  *H01M 4/38*     (2006.01)
  *H01M 4/587*    (2010.01)
  *H01M 4/62*     (2006.01)
  *H01M 10/0525*  (2010.01)

(52) U.S. Cl.
  CPC ....... *H01M 4/624* (2013.01); *H01M 10/0525* (2013.01); *H01M 2004/027* (2013.01)

(58) Field of Classification Search
  CPC ....... H01M 10/0525; H01M 2004/027; H01M 4/364; H01M 4/622; Y02E 60/10
  See application file for complete search history.

(56) References Cited

FOREIGN PATENT DOCUMENTS

| | | |
|---|---|---|
| JP | 2011-192539 A | 9/2011 |
| JP | 2013-114747 A | 6/2013 |
| KR | 10-2017-0111743 A | 10/2017 |

NEGATIVE ELECTRODE FOR NONAQUEOUS ELECTROLYTE SECONDARY BATTERY, AND NONAQUEOUS ELECTROLYTE SECONDARY BATTERY

TECHNICAL FIELD

The present disclosure relates to a negative electrode for a non-aqueous electrolyte secondary battery, and a non-aqueous electrolyte secondary battery.

BACKGROUND ART

A non-aqueous electrolyte secondary battery comprising a positive electrode, a negative electrode, and a non-aqueous electrolyte, in which charge and discharge are performed by transferring lithium ions between the positive electrode and the negative electrode, has been recently widely used as a secondary battery high in output and high in energy density.

Examples of the negative electrode of such a non-aqueous electrolyte secondary battery include the following.

For example, Patent Literature 1 discloses a negative electrode obtained by coating at least one surface of metal foil with a negative electrode mixture paste and then drying the resultant to thereby form a negative electrode active material layer, in which the negative electrode mixture paste includes a negative electrode active material, a carboxymethyl cellulose having a molecular weight of 330000 or less, and a carboxymethyl cellulose having a molecular weight of 330000 or more.

For example, Patent Literature 2 discloses a negative electrode including a current collector, a first mixture layer formed on a surface of the current collector, and a second mixture layer formed on a surface of the first mixture layer, in which the first mixture layer and the second mixture layer include the same binders and thickeners, and the ratio: B2/B1 of the content B2 of the binder in the second mixture layer and the content B1 of the binder in the first mixture layer is 0.1 to 0.5.

CITATION LIST

Patent Literature

PATENT LITERATURE 1: Japanese Unexamined Patent Application Publication No. 2013-114747
PATENT LITERATURE 2: Japanese Unexamined Patent Application Publication No. 2011-192539

SUMMARY

However, a non-aqueous electrolyte secondary battery using such a conventional negative electrode for a non-aqueous electrolyte secondary battery has had a difficulty in achieving both good output characteristics and charge-discharge cycle characteristics.

Therefore, it is an advantage of the present disclosure to provide a negative electrode for a non-aqueous electrolyte secondary battery, and a non-aqueous electrolyte secondary battery, in which both good output characteristics and charge-discharge cycle characteristics can be achieved.

A negative electrode for a non-aqueous electrolyte secondary battery as one aspect of the present disclosure includes a negative electrode current collector and a negative electrode active material layer disposed on the negative electrode current collector, the negative electrode active material layer includes a negative electrode active material and carboxymethyl cellulose, and the carboxymethyl cellulose in a 10% region in a thickness direction, from a surface of the negative electrode active material layer, the surface being on a negative electrode current collector side, is lower in molecular weight than the carboxymethyl cellulose in a 10% region in a thickness direction, from a surface of the negative electrode active material layer, the surface being on an opposite side of the negative electrode current collector.

A non-aqueous electrolyte secondary battery as one aspect of the present disclosure comprises the negative electrode for a non-aqueous electrolyte secondary battery.

According to one aspect of the present disclosure, both good output characteristics and charge-discharge cycle characteristics can be achieved.

DESCRIPTION OF EMBODIMENTS

Figure 1:
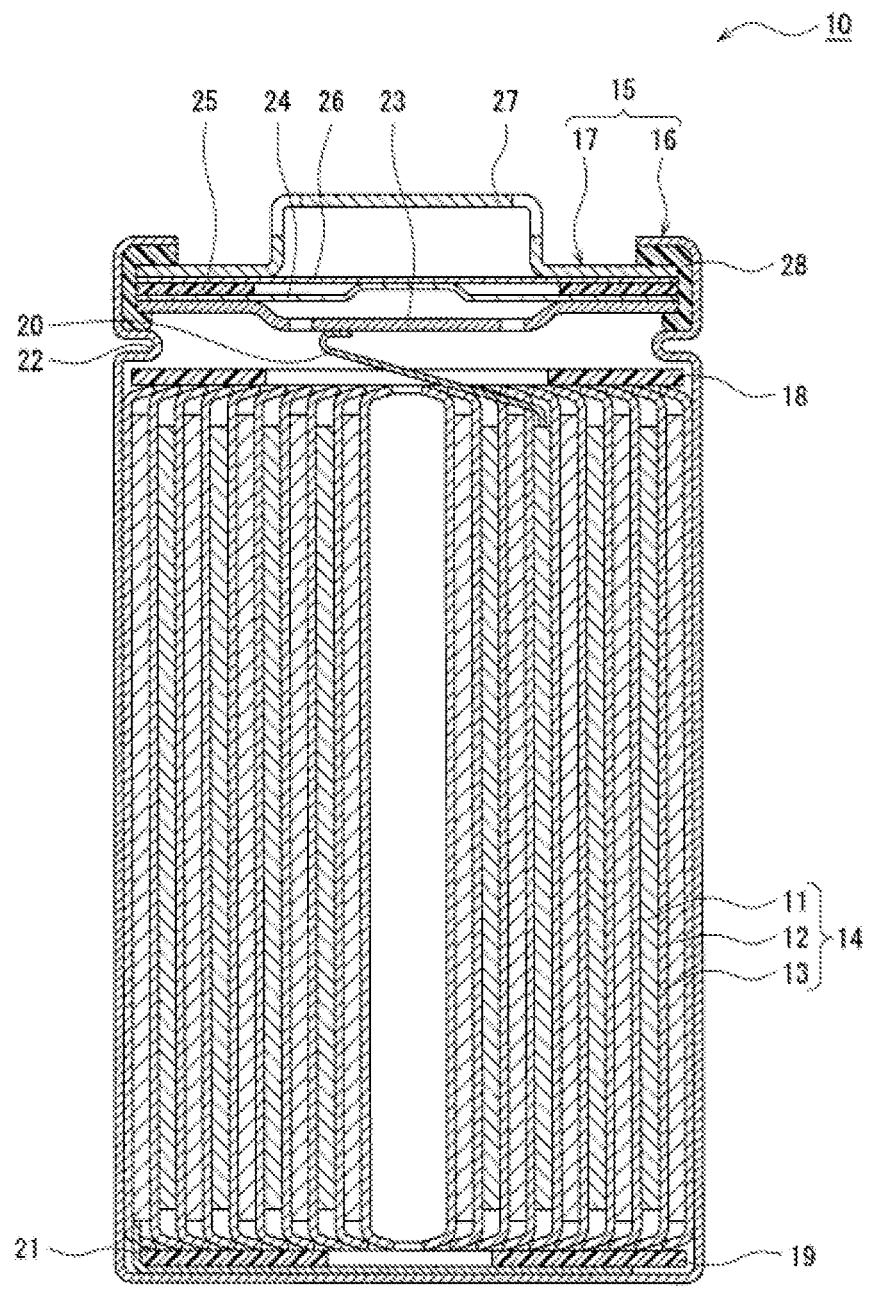
FIG. 1 is a sectional view of a non-aqueous electrolyte secondary battery of an exemplary embodiment.

A negative electrode for a non-aqueous electrolyte secondary battery is produced by coating a negative electrode current collector with a negative electrode mixture slurry in which a negative electrode active material, carboxymethyl cellulose, and the like are dispersed in a solvent such as water, to thereby form a negative electrode active material layer on the negative electrode current collector. If such a negative electrode for a non-aqueous electrolyte secondary battery is low in adhesiveness between the negative electrode current collector and the negative electrode active material layer, the negative electrode active material layer may be partially peeled from the negative electrode current collector upon charge and discharge, resulting in deterioration in charge-discharge cycle characteristics. In addition, if permeability of an electrolyte solution from the outermost surface (surface of the negative electrode active material layer, the surface being on the opposite side of the negative electrode current collector) of the negative electrode active material layer is low, good output is not obtained in some cases. The carboxymethyl cellulose, as the molecular weight thereof is lower, is higher in dispersibility into the solvent and is more easily attached to the negative electrode active material, and thus such a carboxymethyl cellulose low in molecular weight can be used in production of the negative electrode, resulting in improved adhesiveness between the negative electrode active material layer and the negative electrode current collector. However, adhesiveness between particles of the negative electrode active material is also increased and pores between the particles are narrowed, resulting in deterioration in permeability of an electrolyte solution. Accordingly, both good output characteristics and charge-discharge cycle characteristics have been conventionally difficult to achieve, but the present inventors have then made intensive studies, as a result, have found a negative electrode for a non-aqueous electrolyte secondary battery, in which both good output characteristics and charge-discharge cycle characteristics can be achieved. Specifically, the following aspects are shown.

A negative electrode for a non-aqueous electrolyte secondary battery as one aspect of the present disclosure includes a negative electrode current collector and a negative electrode active material layer disposed on the negative electrode current collector, the negative electrode active material layer includes a negative electrode active material and carboxymethyl cellulose, and the carboxymethyl cellulose in a 10% region in the thickness direction, from a surface of the negative electrode active material layer, the surface being on the negative electrode current collector side, is lower in molecular weight than the carboxymethyl cellulose in a 10% region in the thickness direction, from a surface of the negative electrode active material layer, the surface being on the opposite side of the negative electrode current collector. The molecular weight herein represents a weight average molecular weight. The weight average molecular weight can be measured by a known method, and can be measured by, for example, a GPC method.

According to the negative electrode for a non-aqueous electrolyte secondary battery as one aspect of the present disclosure, a carboxymethyl cellulose lower in molecular weight is disposed in a 10% region in the thickness direction, from a surface of the negative electrode active material layer, the surface being on the negative electrode current collector side, and thus adhesiveness between the negative electrode active material layer and the negative electrode current collector is ensured. A carboxymethyl cellulose high in molecular weight is disposed in a 10% region in the thickness direction, from a surface of the negative electrode active material layer, the surface being on the opposite side of the negative electrode current collector, thereby allowing pores between particles of the negative electrode active material to be widened and allowing permeability of an electrolyte solution from the outermost surface of the negative electrode active material layer to be enhanced, as compared with in a 10% region in the thickness direction, from the surface on the negative electrode current collector side. Thus, the negative electrode for a non-aqueous electrolyte secondary battery as one aspect of the present disclosure can be used to thereby allow both good output characteristics and charge-discharge cycle characteristics of a non-aqueous electrolyte secondary battery to be achieved.

Hereinafter, an exemplary embodiment will be described in detail with reference to drawings. The non-aqueous electrolyte secondary battery of the present disclosure is not limited to embodiments described below. The drawings referred to in the description of embodiments are schematically illustrated.

FIG. 1 is a sectional view of a non-aqueous electrolyte secondary battery of an exemplary embodiment. A non-aqueous electrolyte secondary battery 10 shown in FIG. 1 comprises a wound-type electrode assembly 14 formed by winding a positive electrode 11 and a negative electrode 12 with a separator 13 being interposed therebetween, a non-aqueous electrolyte (electrolyte solution), insulating plates 18 and 19 respectively disposed on and under the electrode assembly 14, and a battery case 15 that houses such members. The battery case 15 is configured by a cylindrical case body 16 having a closed-end, and a sealing assembly 17 for closing the opening of the case body 16. Another form of electrode assembly, for example, a stacked electrode assembly formed by stacking alternately a positive electrode and a negative electrode with a separator being interposed therebetween may be here applied instead of the wound-type electrode assembly 14. Examples of the battery case 15 can include a cylindrical, rectangular, coin-shaped, or button-shaped metal exterior can, and a pouch exterior body formed by laminating a resin sheet and a metal sheet.

The case body 16 is, for example, a cylindrical metal exterior having a closed-end. A gasket 28 is disposed between the case body 16 and the sealing assembly 17 to ensure that the interior of the battery is tightly sealed. The case body 16 includes, for example, a projecting portion 22 which has a portion of a lateral surface projected inward and which supports the sealing assembly 17. The projecting portion 22 is preferably formed annularly along the circumferential direction of the case body 16, and the upper surface thereof supports the sealing assembly 17.

The sealing assembly 17 has a structure in which a filter 23, a lower vent member 24, an insulating member 25, an upper vent member 26, and a cap 27 are stacked in the listed order sequentially from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at respective middle portions and the insulating member 25 is interposed between respective circumferences. If the internal pressure of the non-aqueous electrolyte secondary battery 10 increases by heat generation due to, for example, internal short, the lower vent member 24 changes its shape in such a way as to, for example, push up the upper vent member 26 toward the cap 27, and thus ruptures, thereby breaking the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a though-hole in the insulating plate 18 and extends toward the sealing assembly 17, and a negative electrode lead 21 attached to the negative electrode 12 passes on the outside of the insulating plate 19 and extends toward the bottom of the case body 16. The positive electrode lead 20 is connected to the lower surface of the filter 23, which is the bottom board of the sealing assembly 17, by welding or the like, and the cap 27, which is the top board of the sealing assembly 17 and electrically connected to the filter 23, serves as a positive electrode terminal. The negative electrode lead 21 is connected to the inner surface of the bottom of the case body 16 by welding or the like, and the case body 16 serves as a negative electrode terminal.

Hereinafter, each component of the non-aqueous electrolyte secondary battery 10 will be described in detail.

[Negative Electrode]

Figure 2:
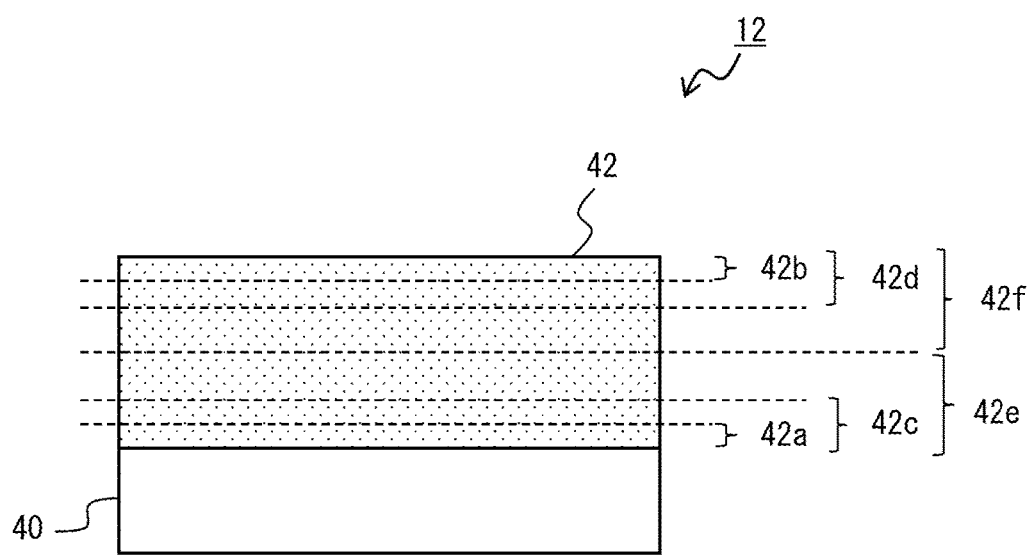
FIG. 2 is a sectional view of a negative electrode of an exemplary embodiment.

FIG. 2 is a sectional view of a negative electrode of an exemplary embodiment. The negative electrode 12 includes a negative electrode current collector 40 and a negative electrode active material layer 42 disposed on the negative electrode current collector 40.

The negative electrode current collector 40 here used is, for example, foil of a metal, such as copper, which is stable in the electric potential range of the negative electrode, or a film in which such a metal is disposed on an outer layer.

The negative electrode active material layer 42 includes a negative electrode active material and carboxymethyl cellulose. The negative electrode active material layer 42 preferably includes, for example, a binder.

A carboxymethyl cellulose in a 10% region 42a in the thickness direction, from a surface of the negative electrode active material layer 42, the surface being on the negative electrode current collector 40 side, is lower in molecular weight than a carboxymethyl cellulose in a 10% region 42b in the thickness direction, from a surface of the negative electrode active material layer, the surface being on the opposite side of the negative electrode current collector 40.

That is, a carboxymethyl cellulose lower in molecular weight is present in the region 42a than in the region 42b, and a carboxymethyl cellulose higher in molecular weight is present in the region 42b than in the region 42a. Such a configuration not only allows adhesiveness between the negative electrode active material layer 42 and the negative electrode current collector 40 to be ensured, but also allows permeability of an electrolyte solution from the outermost surface of the negative electrode active material layer 42 to be enhanced, as described above, and thus both good output characteristics and charge-discharge cycle characteristics of a non-aqueous electrolyte secondary battery can be achieved.

A carboxymethyl cellulose in a 20% region 42c in the thickness direction, from the surface on the negative electrode current collector 40 side, is preferably lower in molecular weight than a carboxymethyl cellulose in a 20% region 42d in the thickness direction, from the surface on the opposite side of the negative electrode current collector 40, and a carboxymethyl cellulose in a 50% region 42e in the thickness direction, from the surface on the negative electrode current collector 40 side, is more preferably lower in molecular weight than a carboxymethyl cellulose in a 50% region 42f in the thickness direction, from the surface on the opposite side of the negative electrode current collector 40, in particular, from the viewpoint that both good output characteristics and charge-discharge cycle characteristics of a non-aqueous electrolyte secondary battery are achieved.

The carboxymethyl cellulose in the region 42a (region 42c or region 42e) preferably has a molecular weight of 330000 or less, more preferably 200000 or less. The lower limit of the molecular weight is not particularly limited, and is, for example, 100000 or more. When the carboxymethyl cellulose in the region 42a (region 42c or region 42e) has a molecular weight of 330000 or less, adhesiveness between the negative electrode current collector 40 and the negative electrode active material layer 42 can be sufficiently ensured, and such a case allows good charge-discharge cycle characteristics to be obtained as compared with when the molecular weight does not satisfy the above range.

The carboxymethyl cellulose in the region 42b (region 42d or region 42o preferably has a molecular weight of more than 330000, more preferably more than 400000. The upper limit of the molecular weight is not particularly limited, and is, for example, 600000 or less. When the carboxymethyl cellulose in the region 42b (region 42d or region 42o has a molecular weight of more than 330000, pores between particles of the negative electrode active material in the region are sufficiently ensured, and thus such a case allows permeability of an electrolyte solution from the outermost surface of the negative electrode active material layer 42 to be enhanced and allows good output characteristics to be obtained as compared with when the molecular weight does not satisfy the above range.

The content of the carboxymethyl cellulose in the negative electrode active material layer 42 is, for example, preferably 0.5% by mass to 3% by mass. A case where the content of the carboxymethyl cellulose in the negative electrode active material layer 42 is less than 0.5% by mass may cause low adhesiveness between particles of the negative electrode active material and adhesiveness between the negative electrode active material layer 42 and the negative electrode current collector 40, resulting in deterioration in charge-discharge cycle characteristics, as compared with when the content is 0.5% by mass or more. A case where the content of the carboxymethyl cellulose in the negative electrode active material layer 42 is more than 3% by mass may cause narrow pores between particles of the negative electrode active material, resulting in deterioration in permeability of an electrolyte solution and thus deterioration in output characteristics, as compared with when the content is 3% by mass or less. The content of the carboxymethyl cellulose in each of the regions of the negative electrode active material layer 42 is, for example, preferably 0.5% by mass to 3% by mass based on the total mass of the negative electrode active material layer 42.

Examples of the negative electrode active material included in the negative electrode active material layer 42 include carbon materials such as graphite particles, non-graphitizable carbon particles, and graphitizable carbon particles, Si materials, and Sn materials. Examples of such a Si material include Si, an alloy including Si, and silicon oxide such as $SiO_X$. $SiO_X$ is less in change of volume according to charge and discharge, than Si, and thus $SiO_X$ is particularly preferably used as the Si material. $SiO_X$ has, for example, a structure in which fine Si is dispersed in a matrix of amorphous $SiO_2$.

When the negative electrode active material includes graphite particles, the graphite particles included in the region 42b (region 42d or region 42o of the negative electrode active material layer 42 preferably have a 10% proof stress of 5 MPa or more. A 10% proof stress of 5 MPa or more means that the pressure applied upon compression of the size of the graphite particles by 10% is 5 MPa or more. Graphite particles having a 10% proof stress of 5 MPa or more allow pores in the region 42b of the negative electrode active material layer 42 to more hardly collapse, resulting in easier movement of Li, than graphite particles having a 10% proof stress of less than 5 MPa, and thus are hard particles favorable for output characteristics. The graphite particles included in the region 42b (region 42d or region 42o of the negative electrode active material layer 42 are graphite particles having a 10% proof stress of 5 MPa or more, thereby allowing good output characteristics to be obtained. The graphite particles included in the region 42a (region 42c or region 42e) of the negative electrode active material layer may have a 10% proof stress of 5 MPa or more or less than 5 MPa. The pressure with respect to the 10% proof stress can be measured using, for example, a micro compression tester (MCT-211 manufactured by Shimadzu Corporation).

When the negative electrode active material includes graphite particles, the graphite particles included in the region 42b (region 42d or region 42o of the negative electrode active material layer 42 preferably include 1% by mass to 5% by mass of an amorphous component. Such graphite particles including 1% by mass to 5% by mass of an amorphous component allow pores in the region 42b of the negative electrode active material layer 42 to more hardly collapse, resulting in easier movement of Li, than graphite particles including an amorphous component in a range not satisfying the above range, and thus are hard particles favorable for output characteristics. The graphite particles included in the region 42b (region 42d or region 42e) of the negative electrode active material layer 42 are graphite particles including 1% by mass to 5% by mass of an amorphous component, thereby allowing good output characteristics to be obtained. The amorphous component included in the graphite particles included in the region 42a (region 42c or region 42e) of the negative electrode active material layer may be here included in a range not satisfying the above range. The amount of the amorphous component in the graphite particles can be quantitatively determined by Raman spectrometry. Specifically, the peak of a G band (G-band) derived from a graphite structure and the peak of a D band (D-band) derived from defects are detected around 1590 cm$^{-1}$ and around 1350 cm$^{-1}$ by Raman spectrometry, respectively, and the amount of the amorphous component in the graphite particles can be determined from the peak intensity ratio of D-band/G-band.

When the negative electrode active material includes the Si material, the region 42b (region 42d or region 42f) of the negative electrode active material layer 42 is preferably lower in content of the Si material than the region 42a (region 42c or region 42e) thereof. The Si material, while is a preferable negative electrode active material in that the material can allow for an increase in capacity of a non-aqueous electrolyte secondary battery, is large in change of volume according to charge and discharge and thus is easily dropped out from the negative electrode active material layer 42. The region 42b (region 42d or region 42f) of the negative electrode active material layer 42 is lower in adhesiveness of the negative electrode active material than the region 42a (region 42c or region 42e) thereof. Accordingly, when the Si material is included, the content of the Si material in the region 42b (region 42d or region 42f) of the negative electrode active material layer 42 may be increased to thereby cause an increase in amount of a Si material dropped out from the negative electrode active material layer 42, resulting in deterioration in battery performance.

The content of the Si material in the region 42b (region 42d or region 42f) of the negative electrode active material layer 42 is, for example, preferably 20% by mass or less, more preferably 15% by mass or less based on the total mass of the negative electrode active material. The content of the Si material in the region 42a (region 42c or region 42e) of the negative electrode active material layer 42 is, for example, preferably in the range from 5% by mass to 25% by mass, more preferably in the range from 8% by mass to 15% by mass, based on the total mass of the negative electrode active material.

Examples of the binder included in the negative electrode active material layer 42 include fluoro resins such as polytetrafluoroethylene (PTFE) and poly(vinylidene fluoride) (PVdF), polyacrylonitrile (PAN), polyimide resins, acrylic resins, polyolefin resins, styrene-butadiene rubber (SBR), nitrile-butadiene rubber (NBR), poly(acrylic acid) (PAA), and poly(vinyl alcohol) (PVA). These may be used singly or may be used in combinations of two or more thereof.

When poly(acrylic acid) (PAA) is included as the binder included in the negative electrode active material layer 42, the region 42a (region 42c or region 42e) of the negative electrode active material layer 42 is preferably higher in content of the poly(acrylic acid) than the region 42b (region 42d or region 42f) thereof. In this case, no poly(acrylic acid) may be included in the region 42b (region 42d or region 42f). The content of the poly(acrylic acid) in the region 42a (region 42c or region 42e) of the negative electrode active material layer 42 is increased to result in higher adhesiveness between the negative electrode active material layer 42 and the negative electrode current collector 40, thereby allowing better charge-discharge cycle characteristics to be obtained.

The negative electrode active material layer 42 may include a conductive agent. The conductive agent may be any material higher in conductivity than the negative electrode active material, and examples thereof include carbon black (CB), acetylene black (AB), Ketjenblack, and a carbon nanotube. The shape (form) of the conductive agent is not limited to the form of particles, and may be, for example, fibrous. In particular, the region 42a (region 42c or region 42e) of the negative electrode active material layer 42 preferably includes a fibrous conductive agent. The fibrous conductive agent is included in the region to thereby allow conductivity between particles to be maintained, for example, even in generation of the change of volume according to charge and discharge and thus allow a current collection structure in an electrode to be hardly broken, thereby allowing better charge-discharge cycle characteristics to be obtained. Herein, the fibrous conductive agent may be optionally included in the region 42b (region 42d or region 42f) of the negative electrode active material layer 42.

One example of a method for producing a negative electrode 12 according to the present embodiment is described. First, a first negative electrode mixture slurry including, for example, a negative electrode active material, carboxymethyl cellulose A (for example, molecular weight 330000 or less), and a solvent such as water is prepared. A second negative electrode mixture slurry is separately prepared, which includes, for example, a negative electrode active material, carboxymethyl cellulose B (for example, having a molecular weight of more than 330000) higher in molecular weight than the carboxymethyl cellulose A, and a solvent such as water. The negative electrode current collector 40 can be coated with the first negative electrode mixture slurry, the resultant can be dried, thereafter a coating derived from the first negative electrode mixture slurry can be coated with the second negative electrode mixture slurry, the resultant can be dried, to thereby form a coating derived from the second negative electrode mixture slurry, thereby obtaining a negative electrode 12 according to the present embodiment. The respective thicknesses of the coating derived from the first negative electrode mixture slurry and the coating derived from the second negative electrode mixture slurry may be appropriately set. In any case, a carboxymethyl cellulose in the 10% region 42a (region 42c or region 42e) in the thickness direction, from the surface of the negative electrode active material layer 42 on the negative electrode current collector 40 side, may be lower in molecular weight than a carboxymethyl cellulose in the 10% region 42b (region 42d or region 42f) in the thickness direction, from the surface on the opposite side of the negative electrode current collector 40. The method, while involves coating with the second negative electrode mixture slurry after coating with the first negative electrode mixture slurry and drying, may be a method involving coating with the second negative electrode mixture slurry after coating with the first negative electrode mixture slurry and before drying.

[Positive Electrode]

The positive electrode 11 is configured from, for example, a positive electrode current collector of metal foil or the like, and a positive electrode active material layer formed on the positive electrode current collector. The positive electrode current collector here used can be, for example, foil of a metal, such as aluminum, which is stable in the electric potential range of the positive electrode, or a film in which such a metal is disposed on an outer layer. The positive electrode active material layer includes, for example, a positive electrode active material, a binder, and a conductive agent.

The positive electrode 11 can be produced by, for example, coating the positive electrode current collector with a positive electrode mixture slurry including, for example, a positive electrode active material, a binder, and a conductive agent, and drying the resultant to thereby form the positive electrode active material layer, and then rolling the positive electrode active material layer.

Examples of the positive electrode active material can include a lithium/transition metal oxide containing a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or a plurality thereof may be mixed and used. The positive electrode active material preferably includes a lithium/nickel complex oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint that the capacity of the non-aqueous electrolyte secondary battery can be increased.

The material of the binder here used can be, for example, the same as that of the binder for use in the negative electrode 12. The positive electrode active material layer may include carboxymethyl cellulose, as in the negative electrode 12. The conductive agent may be any one higher in conductivity than the positive electrode active material, and examples thereof include carbon black (CB), acetylene black (AB), Ketjenblack, a carbon nanotube, and graphite.

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator may be a multi-layered separator including a polyethylene layer and a polypropylene layer, and a surface of a separator to be used may be coated with a material such as an aramid resin or ceramic.

[Non-Aqueous Electrolyte]

The non-aqueous electrolyte includes a non-aqueous solvent and an electrolyte salt dissolved in the non-aqueous solvent. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least a portion of hydrogen of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, di phenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_6F_{2n+1})_x$ (where $1<x<6$, and n is 1 or 2), $LiB_{10}Cl_{10}$, $LiCl$, $LiBr$, $LiI$, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where l and m are integers of 0 or more}. These lithium salts may be used singly or a plurality thereof may be mixed and used. Among these, $LiPF_6$ is preferably used in view of ionic conductivity, electrochemical stability, and other properties. The concentration of the lithium salt is preferably 0.8 to 1.8 mol per liter of the solvent.

EXAMPLES

Hereinafter, the present disclosure will be further described with reference to Examples, but the present disclosure is not intended to be limited to such Examples.

Example 1

[Production of Positive Electrode]

Nickel/lithium cobaltite with aluminum ($LiNi_{0.88}Co_{0.09}Al_{0.03}O_2$) was used as a positive electrode active material. Mixed were 100 parts by mass of the positive electrode active material, 1 part by mass of graphite as a conductive agent, and 0.9 parts by mass of a poly (vinylidene fluoride) powder as a binder, and an appropriate amount of N-methyl-2-pyrrolidone (NMP) was further added thereto to prepare a positive electrode mixture slurry. Both sides of a positive electrode current collector made of aluminum foil (thickness 15 μm) were coated with the slurry, and the resultant coatings were dried and then rolled by a roller to thereby produce a positive electrode in which a positive electrode active material layer was formed on each of both sides of the positive electrode current collector.

[Production of Negative Electrode]

Mixed were 100 parts by mass of graphite particles (10% proof stress: 3.0 MPa, amorphous component: 1% by mass) as a negative electrode active material, 1 part by mass of carboxymethyl cellulose (molecular weight: 355000), 1 part by mass of styrene-butadiene copolymer rubber, and 1 part by mass of poly(acrylic acid), and an appropriate amount of water was further added thereto to prepare a second negative electrode mixture slurry. Mixed were 100 parts by mass of graphite particles (10% proof stress: 3.0 MPa, amorphous component: 1% by mass), 1 part by mass of carboxymethyl cellulose (molecular weight: 220000), 1 part by mass of styrene-butadiene copolymer rubber, and 1 part by mass of poly(acrylic acid), and an appropriate amount of water was further added thereto to prepare a first negative electrode mixture slurry.

Both sides of a negative electrode current collector made of copper foil were coated with the first negative electrode mixture slurry, and the resulting coatings were dried. Then, such coatings derived from the first negative electrode mixture slurry were coated with the second negative electrode mixture slurry, and the resulting coatings were dried. The coating thickness ratio of second negative electrode mixture slurry/first negative electrode mixture slurry was 25/75. Thereafter, the coatings were rolled by a roller to thereby produce a negative electrode in which a negative electrode active material layer was formed on each of both sides of the negative electrode current collector. In other words, a carboxymethyl cellulose in a 10% region in the thickness direction, from a surface of the negative electrode active material layer, the surface being on the negative electrode current collector side, was lower in molecular weight than a carboxymethyl cellulose in a 10% region in the thickness direction, from a surface of the negative electrode active material layer, the surface being on the opposite side of the negative electrode current collector, in the negative electrode produced.

[Production of Non-Aqueous Electrolyte]

Five parts by mass of vinylene carbonate (VC) was added to a non-aqueous solvent obtained by mixing ethylene carbonate (EC) and dimethyl carbonate (DMC) in a volume ratio of 1:3, and $LiPF_6$ was dissolved therein at a concentration of 1.5 mol/L. The resultant was adopted as a non-aqueous electrolyte.

[Production of Non-Aqueous Electrolyte Secondary Battery]

(1) After a positive electrode lead was attached to the positive electrode current collector and a negative electrode lead was attached to the negative electrode current collector, the resultant was wound with a separator including a microporous film made of polyethylene being interposed between the positive electrode and the negative electrode, to thereby produce a wound-type electrode assembly.

(2) Respective insulating plates were disposed on and under the electrode assembly, and the negative electrode lead was welded to a case body and the positive electrode lead was welded to a sealing assembly, to thereby house the electrode assembly in the case body.

(3) After the non-aqueous electrolyte was injected into the case body with a reduced pressure system, the opening of the case body was sealed by the sealing assembly via a gasket. The resultant was adopted as a non-aqueous electrolyte secondary battery.

Example 2

A non-aqueous electrolyte secondary battery was produced in the same manner as in Example 1 except that graphite particles (10% proof stress: 11.6 MPa, amorphous component: 2% by mass) were used as a negative electrode active material in preparation of a second negative electrode mixture slurry.

Example 3

A non-aqueous electrolyte secondary battery was produced in the same manner as in Example 1 except that a mixture including 92 parts by mass of graphite particles (10% proof stress: 3.0 MPa, amorphous component: 1% by mass) and 8 parts by mass of SiO was used as a negative electrode active material in preparation of a first negative electrode mixture slurry and graphite particles (10% proof stress: 11.6 MPa, amorphous component: 2% by mass) were used as a negative electrode active material in preparation of a second negative electrode mixture slurry.

Example 4

A non-aqueous electrolyte secondary battery was produced in the same manner as in Example 1 except that a mixture including 92 parts by mass of graphite particles (10% proof stress: 3.0 MPa, amorphous component: 1% by mass) and 8 parts by mass of SiO was used as a negative electrode active material and a carbon nanotube (fibrous conductive agent) was added in preparation of a first negative electrode mixture slurry and graphite particles (10% proof stress: 11.6 MPa, amorphous component: 2% by mass) were used as a negative electrode active material in preparation of a second negative electrode mixture slurry.

Example 5

A non-aqueous electrolyte secondary battery was produced in the same manner as in Example 1 except that a mixture including 90 parts by mass of graphite particles (10% proof stress: 3.0 MPa, amorphous component: 1% by mass) and 10 parts by mass of SiO was used as a negative electrode active material and a carbon nanotube (fibrous conductive agent) was added in preparation of a first negative electrode mixture slurry, graphite particles (10% proof stress: 11.6 MPa, amorphous component: 2% by mass) were used as a negative electrode active material in preparation of a second negative electrode mixture slurry, and the coating thickness ratio of second negative electrode mixture slurry/first negative electrode mixture slurry was 40/60.

Example 6

A non-aqueous electrolyte secondary battery was produced in the same manner as in Example 1 except that a mixture including 90 parts by mass of graphite particles (10% proof stress: 3 MPa, amorphous component: 1% by mass) and 10 parts by mass of SiO was used as a negative electrode active material and a carbon nanotube (fibrous conductive agent) was added in preparation of a first negative electrode mixture slurry, graphite particles (10% proof stress: 11.6 MPa, amorphous component: 2% by mass) were used as a negative electrode active material and no poly (acrylic acid) was added in preparation of a second negative electrode mixture slurry, and the coating thickness ratio of second negative electrode mixture slurry/first negative electrode mixture slurry was 40/60.

Comparative Example 1

A non-aqueous electrolyte secondary battery was produced in the same manner as in Example 1 except that carboxymethyl cellulose was the same as carboxymethyl cellulose (molecular weight: 355000) in a second negative electrode mixture slurry, in preparation of a first negative electrode mixture slurry. In other words, the molecular weight of a carboxymethyl cellulose in a 10% region in the thickness direction, from a surface of the negative electrode active material layer, the surface being on the negative electrode current collector side was the same as the molecular weight of a carboxymethyl cellulose in a 10% region in the thickness direction, from a surface of the negative electrode active material layer, the surface being on the opposite side of the negative electrode current collector, in the negative electrode produced.

Comparative Example 2

A non-aqueous electrolyte secondary battery was produced in the same manner as in Example 1 except that carboxymethyl cellulose (molecular weight: 355000) was used in preparation of a first negative electrode mixture slurry and carboxymethyl cellulose (molecular weight: 220000) was used in preparation of a second negative electrode mixture slurry. In other words, a carboxymethyl cellulose in a 10% region in the thickness direction, from a surface of the negative electrode active material layer, the surface being on the negative electrode current collector side was higher in molecular weight than a carboxymethyl cellulose in a 10% region in the thickness direction, from a surface of the negative electrode active material layer, the surface being on the opposite side of the negative electrode current collector, in the negative electrode produced.

Comparative Example 3

A non-aqueous electrolyte secondary battery was produced in the same manner as in Example 1 except that carboxymethyl cellulose was the same as carboxymethyl cellulose (molecular weight: 220000) in a first negative electrode mixture slurry, in preparation of a second negative electrode mixture slurry. In other words, the molecular weight of a carboxymethyl cellulose in a 10% region in the thickness direction, from a surface of the negative electrode active material layer, the surface being on the negative electrode current collector side was the same as the molecular weight of a carboxymethyl cellulose in a 10% region in the thickness direction, from a surface of the negative electrode active material layer, the surface being on the opposite side of the negative electrode current collector, in the negative electrode produced.

Comparative Example 4

A non-aqueous electrolyte secondary battery was produced in the same manner as in Example 1 except that a mixture including 94 parts by mass of graphite particles (10% proof stress: 3.0 MPa, amorphous component: 1% by mass) and 6 parts by mass of SiO was used as a negative electrode active material and carboxymethyl cellulose was the same as carboxymethyl cellulose (molecular weight: 355000) in a second negative electrode mixture slurry, in preparation of a first negative electrode mixture slurry, and a mixture including 94 parts by mass of graphite particles (10% proof stress: 3.0 MPa, amorphous component: 1% by mass) and 6 parts by mass of SiO was used as a negative electrode active material in preparation of a second negative electrode mixture slurry.

[Evaluation of Charge-Discharge Cycle Characteristics]

Each of the non-aqueous electrolyte secondary batteries of Examples and Comparative Examples was charged to 4.2 V at a constant current value of 0.5 It and then discharged to 2.5 V at a constant current value of 0.5 It at an environmental temperature of 25° C. Such charge and discharge were defined as one cycle, and performed for 200 cycles. The capacity retention rate in the charge-discharge cycle of each of the non-aqueous electrolyte secondary batteries of Examples and Comparative Examples was determined according to the following expression.

Capacity retention rate=(Discharge capacity at $200^{th}$ cycle/Discharge capacity at $1^{st}$ cycle)×100

Charge-discharge cycle characteristics with respect to each Example and each Comparative Example were evaluated from the capacity retention rate calculated, based on the following criteria. The results were shown in Table 1 and Table 2. In Table 1, each of the non-aqueous electrolyte secondary batteries of Examples 1 and 2, and Comparative Examples 2 and 3 was evaluated with the non-aqueous electrolyte secondary battery of Comparative Example 1, as a reference cell. In Table 2, each of the non-aqueous electrolyte secondary batteries of Examples 3 to 6 was evaluated with the non-aqueous electrolyte secondary battery of Comparative Example 4, as a reference cell.

Excellent: the difference in capacity retention rate from the reference cell was +3% or more (excellent cycle characteristics)

Good: the difference in capacity retention rate from the reference cell was 0% or more and less than +3% (good cycle characteristics)

Fair: the difference in capacity retention rate from the reference cell was −3% or more and less than 0% (standard cycle characteristics)

Poor: the difference in capacity retention rate from the reference cell was less than −3% (poor cycle characteristics)

[Evaluation of Output Characteristics]

Each of the non-aqueous electrolyte secondary batteries of Examples and Comparative Examples was charged to the half of the initial capacity at a constant current of 0.5 It, and then stopped to be charged and left to still stand for 15 minutes, at an environmental temperature of 25° C. Thereafter, such each battery was charged at a constant current of 0.1 It for 10 seconds, and the voltage here was measured. After discharge by a content of capacity corresponding to charge for 10 seconds, the current value was changed, charge was made for 10 seconds and the voltage here was measured, and thereafter discharge was made by a content of capacity corresponding to charge for 10 seconds. The charge and discharge, and voltage measurement were repeated at a current value ranging from 0.1 It to 2 It. The resistance value was determined from a relationship between the voltage value and the current value.

Output characteristics with respect to each Example and each Comparative Example were evaluated from the resistance value calculated, based on the following criteria. The results were shown in Table 1 and Table 2. In Table 1, each of the non-aqueous electrolyte secondary batteries of Examples 1 and 2, and Comparative Examples 2 and 3 was evaluated with the non-aqueous electrolyte secondary battery of Comparative Example 1, as a reference cell. In Table 2, each of the non-aqueous electrolyte secondary batteries of Examples 3 to 6 was evaluated with the non-aqueous electrolyte secondary battery of Comparative Example 4, as a reference cell.

Excellent: the difference in resistance value from the reference cell was −0.02 mΩ or less (excellent output characteristics)

Good: the difference in resistance value from the reference cell was more than −0.02 mΩ and −0.01 mΩV or less (good output characteristics)

Fair: the difference in resistance value from the reference cell was more than −0.01 mΦ and less than +0.01 mΦ (standard output characteristics)

Poor: the difference in resistance value from the reference cell was more than +0.02 or more (poor output characteristics)

TABLE 1

| | First negative electrode mixture slurry | | | | Second negative electrode mixture slurry | | | | Coating thickness ratio of second negative electrode mixture slurry/first negative electrode mixture slurry | Battery characteristics | |
|---|---|---|---|---|---|---|---|---|---|---|---|
| | Molecular weight of CMC | Amount of SiO added/ (% by mass) | Addition of CNT | Amount of PAA added/ (% by mass) | Molecular weight of CMC | 10% proof stress of graphit/ (MPa) | Amount of SiO added/ (% by mass) | Amount of PAA added/ (% by mass) | | Cycle characteristics | Output characteristics |
| Comparative Example 1 | 355000 | 0 | Not added | 1 | 355000 | 3 | 0 | 1 | 25/75 | Reference | Reference |
| Comparative Example 2 | 355000 | 0 | Not added | 1 | 220000 | 3 | 0 | 1 | 25/75 | Fair | Poor |
| Comparative Example 3 | 220000 | 0 | Not added | 1 | 220000 | 3 | 0 | 1 | 25/75 | Good | Poor |
| Example 1 | 220000 | 0 | Not added | 1 | 355000 | 3 | 0 | 1 | 25/75 | Good | Good |
| Example 2 | 220000 | 0 | Not added | 1 | 355000 | 11.6 | 0 | 1 | 25/75 | Good | Excellent |

CMC: Carboxymethyl cellulos
CNT: Carbon nanotube
PAA: Poly(acrylic acid)

TABLE 2

| | First negative electrode mixture slurry | | | | Second negative electrode mixture slurry | | | | Coating thickness ratio of second negative electrode mixture slurry/first negative electrode mixture slurry | Battery characteristics | |
|---|---|---|---|---|---|---|---|---|---|---|---|
| | Molecular weight of CMC | Amount of SiO added/ (% by mass) | Addition of CNT | Amount of PAA added/ (% by mass) | Molecular weight of CMC | 10% proof stress of graphite/ (MPa) | Amount of SiO added/ (% by mass) | Amount of PAA added/ (% by mass) | | Cycle characteristics | Output characteristics |
| Comparative Example 4 | 355000 | 6 | Not added | 1 | 355000 | 3 | 6 | 1 | 25/75 | Reference | Reference |
| Example 3 | 220000 | 8 | Not added | 1 | 355000 | 11.6 | 0 | 1 | 25/75 | Good | Excellent |
| Example 4 | 220000 | 8 | Added | 1 | 355000 | 11.6 | 0 | 1 | 25/75 | Excellent | Excellent |
| Example 5 | 220000 | 10 | Added | 1 | 355000 | 11.6 | 0 | 1 | 40/60 | Excellent | Excellent |
| Example 6 | 220000 | 10 | Added | 1 | 355000 | 11.6 | 0 | 0 | 40/60 | Excellent | Excellent |

CMC: Carboxymethyl cellulos
CNT: Carbon nanotube
PAA: Poly(acrylic acid)

As clear from Tables 1 and 2, Examples 1 and 2 each exhibited good charge-discharge cycle characteristics and output characteristics as compared with Comparative Example 1 as a reference, and Examples 3 to 6 each exhibited good charge-discharge cycle characteristics and output characteristics as compared with Comparative Example 4 as a reference. Accordingly, both good cycle characteristics and output characteristics could be achieved by using a negative electrode in which a carboxymethyl cellulose in a 10% region in the thickness direction, from a surface of the negative electrode active material layer, the surface being on the negative electrode current collector side, was lower in molecular weight than a carboxymethyl cellulose in a 10% region in the thickness direction, from a surface of the negative electrode active material layer, the surface being on the opposite side of the negative electrode current collector.

REFERENCE SIGNS LIST 10 non-aqueous electrolyte secondary battery
11 positive electrode
12 negative electrode
13 separator
14 electrode assembly
15 battery case
16 case body
17 sealing assembly 18, 19 insulating plate
20 positive electrode lead
21 negative electrode lead
22 projecting portion
23 filter
24 lower vent member
25 insulating member
26 upper vent member
27 cap
28 gasket
40 negative electrode current collector
42 negative electrode active material layer

The invention claimed is:

1. A negative electrode for a non-aqueous electrolyte secondary battery, including:
a negative electrode current collector; and
a negative electrode active material layer disposed on the negative electrode current collector, wherein
the negative electrode active material layer includes a negative electrode active material and carboxymethyl cellulose, and
the carboxymethyl cellulose in an inner 10% region constituting 10% of a total thickness of the negative electrode active material layer from one surface of the negative electrode active material layer facing toward the negative electrode current collector is lower in molecular weight than the carboxymethyl cellulose in an outer 10% region constituting 10% of the total thickness of the negative electrode active material layer from another surface, opposite the one surface, of the negative electrode active material layer facing away from the negative electrode current collector.

2. The negative electrode for a non-aqueous electrolyte secondary battery according to claim 1, wherein the carboxymethyl cellulose in the inner 10% region has a molecular weight of 330000 or less.

3. The negative electrode for a non-aqueous electrolyte secondary battery according to claim 1, wherein a content of the carboxymethyl cellulose in the negative electrode active material layer is 0.5% by mass to 3% by mass.

4. The negative electrode for a non-aqueous electrolyte secondary battery according to claim 1, wherein
the negative electrode active material includes graphite particles, and
the graphite particles in the outer 10% region have a 10% proof stress of 5 MPa or more.

5. The negative electrode for a non-aqueous electrolyte secondary battery according to claim 1, wherein
the negative electrode active material includes graphite particles, and
the graphite particles in the outer 10% region include 1% by mass to 5% by mass of an amorphous component.

6. The negative electrode for a non-aqueous electrolyte secondary battery according to claim 1, wherein
the negative electrode active material includes a Si material, and
the outer 10% region is lower in content of the Si material than the inner 10% region.

7. The negative electrode for a non-aqueous electrolyte secondary battery according to claim 1, wherein a fibrous conductive agent is included in the inner 10% region.

8. The negative electrode for a non-aqueous electrolyte secondary battery according to claim 1, wherein
the negative electrode active material layer include poly (acrylic acid), and
the inner 10% region is higher in content of the poly (acrylic acid) than the outer 10% region.

9. A non-aqueous electrolyte secondary battery, comprising:
the negative electrode for a non-aqueous electrolyte secondary battery according to claim 1.

* * * * *